United States Patent [19]
Watanabe et al.

[11] Patent Number: 4,959,431
[45] Date of Patent: Sep. 25, 1990

[54] OPTICAL MATERIAL

[75] Inventors: Nobuhiro Watanabe, Matsudo; Teruo Sakagami, Tokyo, both of Japan

[73] Assignee: Kureha Kagaku Kogyo Kabushiki Kaisha, Japan

[21] Appl. No.: 270,802

[22] Filed: Nov. 14, 1988

[30] Foreign Application Priority Data

Dec. 8, 1987 [JP] Japan ............................... 62-308516
Dec. 8, 1987 [JP] Japan ............................... 62-308517

[51] Int. Cl.$^5$ ............................................. C08F 26/06
[52] U.S. Cl. ..................................... 526/261; 526/263; 350/409
[58] Field of Search ................. 526/263, 261; 350/409

[56] References Cited

U.S. PATENT DOCUMENTS 4,451,630  5/1984  Atkinson et al.
4,492,776  1/1985  Atkinson et al.

FOREIGN PATENT DOCUMENTS 59-9036113A  8/1984  Japan ................................. 526/261
60-63214     4/1985  Japan .

Primary Examiner—Joseph L. Schofer
Assistant Examiner—Alex H. Walker
Attorney, Agent, or Firm—Arnold, White & Durkee

[57] ABSTRACT

An optical material formed of a copolymer is disclosed. The copolymer is obtained by polymerizing a monomer composition composed of a particular N-substituted trifunctional monomer having a triazine ring structure and a monomer copolymerizable with the isocyanurate. Where the copolymerizable monomer is a specific aliphatic bifunctional monomer, the monomer composition additionally contains a further monomer which is copolymerizable with the aforementioned components and contains at least one ethylenically-unsaturated group.

7 Claims, No Drawings

OPTICAL MATERIAL

BACKGROUND OF THE INVENTION (1) Field of the Invention

This invention relates to an optical material, and specifically, to an optical material having superb practical properties typified by excellent dyeability and high refractive index.

(2) Description of the Related Art

Inorganic glass has heretofore been used widely as an optical material for optical parts or members of various precision machines and instruments, camera lenses, spectacle lenses, dark glasses, etc. Optical materials composed of plastics have however been finding utility in recent years as substitutes for inorganic glass from the viewpoint of weight reduction.

In addition to their merit of light weights, plastic-made optical materials have another attractive property in that they can be dyed even after their molding or forming unlike inorganic glass. This dyeability is important especially in the case of spectacle lenses.

As plastics which have heretofore been used abundantly as plastic-made optical materials, polymethyl methacrylate, polystyrene, polycarbonates and polydiethylene glycol bisallyl carbonate called "CR-39" (trade name; product of PPG Industries, Inc.) are known.

Polystyrene however does not permit its dyeing at all with any water-dispersible dye after its molding or forming. In some instances, a mere contact to an organic solvent may result in a detriment attack to its surface so that cracks may be formed there. Moreover, polystyrene is insufficient in heat resistance. It is hence a material having poor practical utility as an optical material.

On the other hand, polymethyl methacrylate and polycarbonates are dyeable with a water-dispersible dye even after their molding or forming. These materials however involve such problems that in addition to their susceptibility to an attack by an organic solvent, polymethyl methacrylate does not have sufficient heat resistance while polycarbonates have a large optical strain, and a significant limitation has thus been imposed on their utility as optical materials.

Although "CR-39" does not have injection moldability, it may generally be regarded as a preferable material in that it has a crosslinked structure of a sufficiently high degree, is equipped with good heat resistance and solvent resistance sufficient to withstand ordinary organic solvents and moreover, has dyeability. This optical material is however is accompanied by a drawback that its refractive index is as low as 1.49 ($n_d = 1.49$). If a spectacle lens should be formed with this material, the lens thickness will become significantly greater compared to that required for a material having a high refractive index so that its light-weight merit will be lost as a matter of fact.

Under the circumstances, attempts have been made to increase the refractive index of "CR-39" while retaining its advantageous properties. Specifically, investigations are now under way with respect to copolymerization of diethylene glycol bis(allyl carbonate) with a monomer having a high refractive index.

The radically-polymerizable functional groups of diethylene glycol bis(allyl carbonate) are however allyl groups, which have lower radical polymerizability compared to polymerizable groups of many monomers, such as acryl groups.

Accordingly, monomers capable of undergoing suitable copolymerization with diethylene glycol bis(allyl carbonate) are limited to those containing one or more allyl groups as functional groups in practice. It is difficult to copolymerize it with many monomers which contain one or more useful functional groups having high radical polymerizability, such as acryl, methacryl and/or vinyl groups. For these reasons, it is the current situation that no copolymer has been provided with a high refractive index while retaining the excellent physical properties of "CR-39".

From the foregoing circumstances, it is desired to provide an optical material which has excellent properties such that it permits easy copolymerization with monomers having one or more functional groups of high radical polymerizability, such as acryl, methacryl and/or vinyl groups, has a crosslinked structure of a sufficiently high degree and moreover, possesses good dyeability.

As has already been mentioned above, there is an outstanding demand for the development of optical materials having a high refractive index. A variety of proposals have been made toward this demand, and some of them have already been used actually. It has been known to be effective to have an aromatic compound or a halogen-substituted aromatic compound included as a component in order to obtain an optical material having a high refractive index. A variety of investigations have been made making use of this technique. Introduction of such a component into a plastic-made optical material however leads to an optical material of reduced impact resistance or of a greater specific gravity, so that the inherent merits of the plastic-made optical material are sacrificed. As a matter of fact, it has not been succeeded to provide any optical material capable of affording a plastic lens having a high refractive index, great impact resistance and a small specific gravity.

SUMMARY OF THE INVENTION

The present invention has been completed with the foregoing circumstances in view. An object of this invention is to provide an optical material having excellent properties and composed of a polymer which can be produced by radical polymerization and has a highly-crosslinked structure and moreover good dyeability.

Another object of this invention is to provide an optical material having a high refractive index and moreover great impact resistance and a small specific gravity.

In one aspect of this invention, there is thus provided an optical material comprising a copolymer obtained by polymerizing a monomer composition composed of at least 30 parts by weight of Component A, which comprises a trifunctional monomer represented by the following formula [A], and at most 70 parts by weight of a monomer copolymerizable with Component A.

Formula [A]

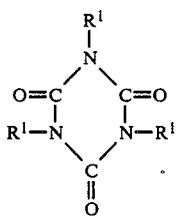

where R¹ means

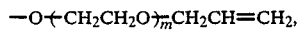

in which n is an integer of 2–8 and R² is a radically-polymerizable functional group represented by $-O\!-\!(CH_2CH_2O)_{\overline{m}}CH_2CH\!=\!CH_2,$

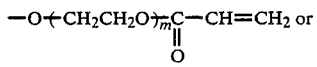

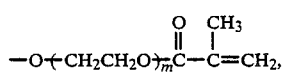

m being an integer of 0–2.

In another aspect of this invention, there is also provided an optical material comprising a copolymer obtained by polymerizing a monomer composition composed of 30–65 parts by weight of Component A which comprises a trifunctional monomer represented by the following formula [A], 10–30 parts by weight of Component B which comprises an aliphatic bifunctional monomer represented by the following formula [B], and 30–55 parts by weight of Component C formed of a copolymerizable monomer which is copolymerizable with Components A and B and contains an aromatic group.

Formula [A]

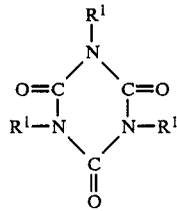

wherein R¹ means

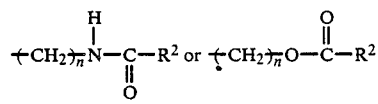

in which n is an integer of 2–8 and R² is a radically-polymerizable functional group represented by $-O\!-\!(CH_2CH_2O)_{\overline{m}}CH_2CH\!=\!CH_2,$

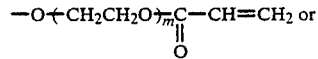

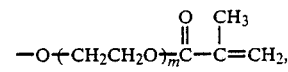

m being an integer of 0–2.

Formula [B]

$R^4-O-R^3-O-R^5$ wherein R³ means a hydrocarbon group having 2–8 carbon atoms, and R⁴ and R⁵ may be the same or different and individually denote a radically-polymerizable functional group represented by $(CH_2CH_2O)_{\overline{p}}CH_2CH\!=\!CH_2,$

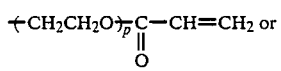

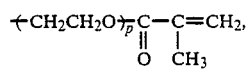

p being an integer of 0–2.

In the first aspect of this invention, the copolymer is obtained by polymerizing the monomer composition containing Component A, which is a particular trifunctional monomer having a triazine ring structure, in a proportion of at least 30 parts by weight per 100 parts by weight of the monomer composition. The copolymer hence has high transparency. It has a three-dimensional crosslinked structure of a sufficiently high degree, whereby it has great heat resistance and can withstand organic solvents. In addition, it has good dyeability so that it can be dyed with a conventional water-dispersible dye.

Furthermore, the copolymer according to the second aspect of this invention, which is obtained by copolymerizing Components A, B and C in the specific proportions, has a sufficiently high refractive index of at least 1.53 ($n_d \geq 1.53$), a low specific gravity of 1.25 or lower, and moreover sufficiently high impact resistance. Namely, the optical material obtained by copolymerizing Components A, B and C in the specific relative proportions has been imparted with high impact resistance and also with a high refractive index and excellent heat resistance and these properties are well-balanced, because Component A is the specific trifunctional monomer and a crosslinked structure of a high degree has hence been formed in the resultant copolymer. On the other hand, Component B has contributed to the formation of the crosslinked structure and has realized the sufficiently high impact resistance. Further, the high refractive index has been brought about by Component C. Accordingly, the optical material according to the second aspect of this invention has advantages that it has properties excellent as an optical material for plastic lenses and moreover, these properties are well-balanced, thereby making it possible to actually provide plastic lenses having a light weight and a thin thickness and moreover, a high degree of safety.

DETAILED DESCRIPTION OF THE INVENTION AND PREFERRED EMBODIMENTS

Component A useful in the practice of this invention is a trifunctional monomer having the triazine ring structure as apparent from the formula [A]. The triazine ring structure is a skeletal structural unit featuring extremely high chemical stability and great heat resistance. Since Component A is a radically-polymerizable trifunctional monomer having such a triazine structure, the resultant copolymer will have a well-developed, three-dimensionally crosslinked, network structure. Owing to this crosslinked structure, the copolymer has great impact resistance and its heat resistance is excellent.

It is a first advantage of Component A that it forms a highly-developed stable crosslinked structure as mentioned above and it has great compatibility with other monomer or monomers. Owing to this advantage, its copolymerization with other monomer or monomers is conducted with ease, and the resulting copolymer has excellent transparency and is useful as an optical material.

It is a second advantage of Component A that owing to its bulky triazine ring structure, it forms a copolymer having a lower specific gravity and a high refractive index compared to crosslinked polymers of usual aliphatic monomers.

The radically-polymerizable functional groups bonded to the triazine skeleton in Component A are allyl, acryl or methacryl groups. These functional groups are bonded via an ether, urethane or carbonate bond.

The values of n and m in the formula [A] are important in this invention. In particular, the value of n is extremely important. Where the value of n is small and the carbon chain is short, the resulting copolymer will be advantageous in that its refractive index will be high, but its impact resistance will be low. Although those having a value n in a range of 2–8 are usable as Component A in this invention, those having a value n of 3 or greater are preferred in particular. Values n smaller than 2 will result in copolymers having very small impact resistance. On the other hand, values n greater than 8 will not provide a high refractive index. Where n is 3 or greater, a copolymer having excellent impact resistance and a small specific gravity will be obtained without failure. Where the value m is smaller and the ethylene oxide chain is short, a copolymer will be obtained with a higher refractive index and reduced impact resistance. The value m may however be preferably chosen from the range of 0–2 so long as the condition of the value n being 2 or greater, especially, 3 or greater is satisfied. Accordingly, the values n and m in Component A can be suitably chosen within their respective ranges depending on the purpose of use of an optical material to be obtained.

Where the radically-polymerizable functional groups are acryl or methacryl groups in Component A, Component A may be suitably copolymerized in a relatively desired proportion with an acrylic or methacrylic monomer which is effective in increasing the refractive index. Since Component A is trifunctional as already mentioned above, the resulting copolymer will also have a three-dimensionally crosslinked bulky structure of a high crosslinking degree in this case. Therefore, the copolymer will have sufficient heat resistance as an optical material and will not be attacked at all by organic solvents employed routinely, and its stability to chemical reagents will be excellent and its specific gravity will be small.

Further, the copolymer of Component A can be dyed with an aqueous solution of a water-dispersible dye by a simple treatment, for example, by merely dipping the copolymer under heat in the aqueous solution. Although a polymer having a high refractive index generally has strong aromatic nature and large hydrophobicity and is not dyeable with a water-dispersible dye in many instances, the incorporation of Component A has made it possible to obtain a copolymer having sufficient and good dyeability.

In Component A, each $R^1$ may be a group formed of the $R^2$ chain and the oxide bonded to the chain by way of a urethane or carbonate bond. Use of Component A with such a urethane or carbonate bond as mentioned above is preferred because a copolymer having still better dyeability is obtained.

As specific examples of Component A useful in the practice of this invention, may be mentioned tris(2-allyloxyethyl) isocyanurate, tris(2-acryloxyethyl) isocyanurate, tris(2-methacryloxyethyl) isocyanurate, tris(acryloxyethoxyethyl) isocyanurate, tris(methacryloxyethoxyethyl) isocyanurate, tris(allyloxydiethoxyethyl) isocyanurate, tris(acryloxydiethoxyethyl) isocyanurate, tris(3-allyloxypropyl) isocyanurate, tris(methacryloxyethoxypropyl) isocyanurate, tris-N-(methacryloxyethoxycarbamoylhexyl) isocyanurate, tris-N-(acryloxyethoxyethoxycarbamoylhexyl) isocyanurate, tris-N-(allyloxycarboxy-2-hydroxyethyl) isocyanurate, tris-N-(allyloxyethoxyethoxycarbonyl-2-hydroxyethyl) isocyanurate, etc. Component A is however not necessarily limited to them.

Component A is converted into an optical material by its copolymerization with a monomer copolymerizable thereto. No particular limitation is imposed on such a monomer, so long as it contains one or more ordinary radically-polymerizable groups such as acryl, methacryl and/or vinyl groups. As its specific examples, may be mentioned vinyl compounds such as styrene, α-methylstyrene, divinylbenzene, isopropenyl benzene, vinylphenol, acrylonitrile, p-methylstyrene, vinylnaphthalene, chlorostyrene and bromostyrene, and mixtures thereof; aliphatic or aromatic acrylates and methacrylates such as phenyl methacrylate, acryloxyethoxybenzene, methacryloxyethoxybenzene, 1-methacryloxy-2,4,6-tribromobenzene, 2,2-bis[4-(methacryloxyethoxy)phenyl]propane, 2,2-bis[4-(acryloxypolyethoxyphenyl)]propane, methyl methacrylate, isobutyl methacrylate, 1,3-butane-diol dimethacrylate, ethylene glycol dimethacrylate and diethylene glycol dimethacrylate, and mixtures thereof. It should however be borne in mind that the copolymerizable monomer is not limited to them.

In the optical material according to the one aspect of this invention, the proportion of Component A can be changed in various ways depending on the target optical material. The proportion of Component A can therefore be changed in accordance with various purposes, for example, when it is desired to obtain an optical material to be employed in a field where heat resistance and solvent resistance are of primary importance, when an optical material having good dyeability is desired, or when an optical material having a high refractive index is sought for. It is however necessary for the provision of a copolymer having good dyeability and excellent crosslinkability to control Component A in a proportion of at least 30 parts by weight per 100 parts by weight of the monomer composition. If the proportion of Component A is smaller than 30 parts by weight per 100 parts by weight of the monomer composition, the good properties inherent to Component A will not be showed up by the resulting copolymer so that the copolymer will be inferior in heat resistance and solvent resistance and will not provide sufficient dyeability.

The optical material according to the one embodiment of this invention can generally be produced by a conventional radical polymerization process making use of a radical polymerization initiator known to the public, since the polymerizable functional groups of Component A are radically polymerizable. The resultant copolymer is therefore in a crosslinked form so that it can hardly be molded by injection molding. Therefore, it is preferable practically to obtain the optical material by using a casting polymerization process in which a casting mold is employed. Namely, it is necessary to add a conventional radical polymerization initiator to the monomer mixture containing Component A in a proportion of 30 parts by weight per 100 parts by weight of the monomer composition, pouring the resultant mixture into a mold of a plate-like, lens-like, cylindrical, prismatic, conical or spherical shape or of any other shape designed in accordance with the end use and made of a material such as glass, plastic or metal, and then heating the mixture for its polymerization.

The monomer composition with the radical polymerization initiator added thereto can also contain a colorant, an ultraviolet absorbent, an antioxidant, a heat stabilizer and/or one or more other auxiliary additives in accordance with the intended end use of the optical material to be obtained.

Besides the above-described casting polymerization, the intended lens or other optical material can be produced by obtaining a copolymer, for example, of a plate-like or other shape from the above monomer mixture and then subjecting the copolymer to cutting and grinding. Various properties of the optical material can be improved further by applying surface grinding or an antistatic treatment thereto as needed.

It is also feasible to coat the optical material with an inorganic or organic hard coating material so as to enhance its surface hardness or to apply a reflection-free coating film. Dyeing may also be applied in the course of these secondary treatment or processing steps if desired.

Upon copolymerization of Components A, B and C in the second aspect of this invention, the proportion of Component A is controlled at 30–65 parts by weight, preferably, 35–65 parts by weight per 100 parts by weight of the monomer composition. So long as its proportion is at least 35 parts by weight, it is possible to obtain a copolymer well-balanced in refractive index and impact resistance. If its proportion however exceeds 65 parts by weight, the resultant monomer composition will have an unduly high viscosity so that it will be difficult to conduct its casting polymerization at room temperature. In particular, it is desirable to limit the proportion to 55 parts by weight or less from the viewpoint of productivity in actual fabrication.

Component B is an aliphatic bifunctional monomer. Since Component B is an aliphatic compound, it is very effective in imparting flexibility to the copolymer and as a result, improving its impact resistance. Moreover, Component B is incorporated in the crosslinked structure as it is a bifunctional monomer, so that it does not reduce the heat resistance of the copolymer. In the formula [B], $R^3$ is a hydrocarbon group. As the carbon number of the copolymer increases, its impact resistance is improved but its refractive index is lowered on the contrary. Similarly, the impact resistance of the copolymer increases but its refractive index decreases, as p indicating the numbers of ethylene oxide moieties in the functional groups $R^4$ and $R^5$ becomes greater. Therefore, the carbon number of $R^3$ and the value of p should be selected in accordance with the end use. In order to obtain a copolymer of well-balanced impact resistance and refractive index, it is generally preferable to choose an aliphatic bifunctional monomer of formula [B] in which p in each of $R^4$ and $R^5$ is 0–1 where the carbon number of $R^3$ ranges from 6 to 8, 1 where the carbon number of $R^3$ ranges from 4 to 6 or 1–2 where the carbon number of $R^3$ ranges from 2 to 4.

As specific examples of Component B, may be mentioned ethylene glycol diallyl ether, diethylene glycol diallyl ether, propylene glycol diallyl ether, 1,3-butanediol diallyl ether, ethylene glycol dimethacrylate, propylene glycol diacrylate, diethylene glycol dimethacrylate, 1,3-butanediol dimethacrylate, propyleneglycol diacrylate, 1,6-hexanediol dimethacrylate, hexamethylene glycol diacrylate, and the like. It should however be borne in mind that Component B is not limited to these specific examples.

The proportion of Component B should range from 10 parts by weight to 30 parts by weight per 100 parts by weight of the monomer composition. If this proportion should be smaller than 10 parts by weight, it will be impossible to obtain a copolymer having sufficient impact resistance. On the other hand, any proportions in excess of 30 parts by weight will result in a copolymer having a low refractive index albeit its impact resistance will be good.

Component C is a copolymerizable monomer having an aromatic group. Its copolymerization with Components A and B can provide a copolymer having a refractive index as high as at least 1.53 ($n_d \geq 1.53$). No additional limitations are imposed particularly, so long as Component C contains an aromatic group and has radical copolymerizability with Components A and B. Halogen-substituted monomers are however not preferred since they generally result in copolymers having a higher specific gravity. It should however be borne in mind that use of such a halogen-substituted monomer as a portion of Component C is not excluded.

As specific examples of Component C, may be mentioned allylphenol, diallyl phthalate, styrene, α-methylstyrene, divinylbenzene, p-chlorostyrene, phenyl methacrylate, acryloxyethoxybenzene, methacryloxydiethoxybenzene, 2,2-bis[4-(methacryloxyethoxy)phenyl)]propane, etc. Component C should however not be limited to these exemplary monomers.

The proportion of Component C should range from 30 parts by weight to 55 parts by weight per 100 parts by weight of the monomer composition. Any proportions smaller than 30 parts by weight will lead to a copolymer having a low refractive index, while any proportions greater than 55 parts by weight will result in a copolymer having small impact resistance albeit its refractive index will be high.

Although the radically-polymerizable functional groups of Component A are allyl, acryl or methacryl groups allyl groups are generally lower in radical polymerizability compared to acryl and methacryl groups. When A component whose functional groups are allyl groups are used, it is desirable to use monomers, whose radically-polymerizable functional groups are allyl groups, as Components B and C which are components to be copolymerized. When the functional groups of Component A are acryl or methacryl groups, it is preferred to use as Components B and C those containing acryl or methacryl groups as their functional groups. In these cases, the polymerization of the monomer composition can be conducted smoothly and suitably.

A copolymer having excellent dyeability, a refractive index as high as 1.53 or higher ($n_d \geq 1.53$), a specific gravity as low as 1.3 or smaller and large impact resistance can be obtained by polymerizing the monomer composition containing the monomers of the above specific kinds, namely, Components A, B and C in the specific proportions as described above. Incidentally, the polymerization process aforementioned can also be applied as is upon polymerization of Components A, B and C.

[EXAMPLES]

A description will hereinafter be made of certain Examples of this invention. It should however be borne in mind that the present invention is not limited by or to the following Examples.

Example 1

To a monomer composition which had been obtained by mixing 50 parts by weight of tris(2-methacryloxyethoxyethyl) isocyanurate of the formula (A) in which $R^1$ is

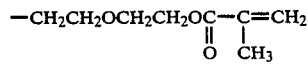

and 50 parts by weight of styrene, 1 part by weight of lauroyl peroxide was added as a polymerization initiator. The resultant mixture was poured into a mold made of stainless steel. The mixture was heated at 50° C. for 4 hours and further from 50° C. to 90° C. over 20 hours, whereby it was heated to obtain a copolymer molded in the shape of a plate of 2 mm thick.

The refractive index of the copolymer was measured by an Abbe's refractometer. Its refractive index, $n_d$, was 1.551 and its Abbe number was 38. On the other hand, its specific gravity was 1.20.

After grinding the surfaces of the thus-molded copolymer into optical surfaces, its transmission in the visible range was measured by an instantaneous multiple light measuring system "MCPD-100" (trade name; manufactured by Otsuka Denshi K.K.) which was equipped with a 150W xenone lamp. It was found to be 91%, so that it had high transparency.

The thus-molded copolymer was dipped at 30° C. for 30 minutes in organic solvents such as acetone, toluene and tetrahydrofuran. No changes were observed in weight or surface conditions by the dipping. It was therefore found to be a copolymer having excellent solvent resistance.

In order to investigate the dyeability of the copolymer, the copolymer was dipped at 80° C. for 10 minutes in a 0.15% aqueous solution of "Sumikaron Blue E-FBL" (trade name; product of SUMITOMO CHEMICAL CO., LTD.). As a result, it was dyed in a vivid blue color.

As has been demonstrated above, the copolymer can be dyed satisfactorily even under conditions incapable for dyeing polystyrene and moreover, have the high refractive index.

Further, concave lenses having an outer diameter of 70 mm, a central thickness of 1.6 mm and a degree of −3.00 diopter were produced by pouring the above monomer composition into lens-producing glass molds and then polymerizing it in situ.

Using the lenses as samples, an impact resistance test was performed in accordance with the falling ball method. Namely, a steel ball of 16.3 g heavy was caused to undergo free falling at 20° C. onto each of the sample from a height of 1.27 m to investigate if the sample would be broken or not. When the test was conducted on ten of the samples, none of the samples were broken. The lenses made of the copolymer were therefore found to have excellent impact resistance.

Example 2

To a monomer composition which had been obtained by mixing 55 parts by weight of tris(3-acryloxypropyl) isocyanurate of the formula (A) in which $R^1$ is

25 parts by weight of by weight of 1-methacryloxy-2,4,6-tribromobenzene represented by the following formula:

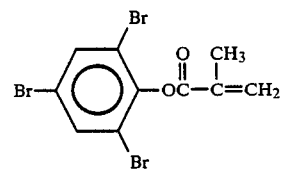

and 20 parts by weight of styrene, 1 part by weight of lauroyl peroxide was added as a polymerization initiator. The resultant mixture was polymerized in the same manner as in Example 1, thereby obtaining a colorless transparent copolymer molded in the shape of a plate of about 2 mm thick.

The refractive index, $n_d$, of the copolymer was 1.559 and its Abbe number was 37.8. On the other hand, its specific gravity was 1.24. With respect to the thus-molded copolymer, the transmission in the visible range was measured in the same manner as in Example 1. It was found to be 92%.

The thus-molded copolymer was dipped in organic solvents such as acetone, toluene and tetrahydrofuran in the same manner as in Example 1. It was not damaged at all.

The copolymer was dipped at 80° C. for 10 minutes in a similar aqueous dye solution as in Example 1. As a result, it was dyed in a vivid blue color.

On the other hand, a copolymer molded in the shape of a plate was obtained for the sake of comparison from 60 parts by weight of styrene and 40 parts by weight of 1-methacryloxy-2,4,6-tribromobenzene. It was dipped at 80° C. for 30 minutes in a similar aqueous dye solution as in Example 1. Its dyeing was absolutely impossible. When the comparative copolymer was dipped in toluene, its dissolution started immediately from the surfaces thereof.

From the foregoing, it is clear that the optical material of this invention is dyeable in spite of its excellent solvent resistance and has the high refractive index, and is hence useful.

Further, concave lenses having an outer diameter of 70 mm, a central thickness of 1.6 mm and a degree of $-3.25$ diopter were produced from the above monomer composition in the same manner as in Example 1. Using them as samples, a similar impact resistance test as in Example 1 was performed on ten of the samples in accordance with the falling ball method. None of the samples were broken.

Example 3

To a monomer composition which had been obtained by mixing 60 parts by weight of tris(N-methacryloxyethoxycarbamoylhexyl) isocyanurate of the formula (A) in which $R^1$ is

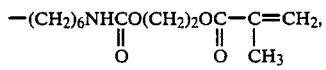

30 parts by weight of styrene and 10 parts by weight of α-methylstyrene, 1 part by weight of lauroyl peroxide was added as a polymerization initiator. The resultant mixture was polymerized in the same manner as in Example 1, thereby obtaining a colorless transparent copolymer molded in the shape of a plate.

The refractive index, $n_d$, of the copolymer was 1.552 and its Abbe number was 38.8. On the other hand, its specific gravity was 1.14. With respect to the thus-molded copolymer, the transmission in the visible range was measured in the same manner as in Example 1. It was found to be 94%.

The thus-molded copolymer was dipped in organic solvents such as acetone, toluene and tetrahydrofuran in the same manner as in Example 1. It was not damaged at all.

The copolymer was subjected to a dyeing treatment in the same manner as in Example 1. As a result, it was successfully dyed in a vivid blue color.

Further, concave lenses having an outer diameter of 70 mm, a central thickness of 1.6 mm and a degree of $-3.00$ diopter were produced from the above monomer composition in the same manner as in Example 1. Using them as samples, a similar impact resistance test as in Example 1 was performed on ten of the samples in accordance with the falling ball method. None of the samples were broken.

Example 4

To a monomer composition which had been obtained by mixing 50 parts by weight of tris(N-acryloxyethoxyethoxycarboxyethyl) isocyanurate of the formula (A) in which $R^1$ is $$-(CH_2)_2O\underset{\underset{O}{\|}}{C}O-(CH_2)_2-O(CH_2)_2-O-\underset{\underset{O}{\|}}{C}-CH=CH_2,$$

30 parts by weight of phenyl methacrylate represented by the following formula:

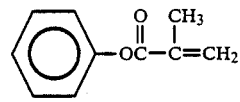

and 20 parts by weight of styrene, 1 part by weight of lauroyl peroxide was added. The resultant mixture was polymerized in the same manner as in Example 1, thereby obtaining a colorless transparent copolymer molded in the shape of a plate.

The refractive index, $n_d$, of the copolymer was 1.548 and its Abbe number was 42. On the other hand, its specific gravity was 1.16. With respect to the thus-molded copolymer, the transmission in the visible range was measured in the same manner as in Example 1. It was found to be 92%.

The thus-molded copolymer was dipped in organic solvents such as acetone, toluene and tetrahydrofuran in the same manner as in Example 1. It was not damaged at all.

The copolymer was subjected to a dyeing treatment in the same manner as in Example 1. As a result, it was successfully dyed in a vivid blue color.

Further, concave lenses having an outer diameter of 70 mm, a central thickness of 1.6 mm and a degree of $-2.75$ diopter were produced from the above monomer composition in the same manner as in Example 1. Using them as samples, a similar impact resistance test as in Example 1 was performed on ten of the samples in accordance with the falling ball method. None of the samples were broken.

On the other hand, a copolymer molded in the shape of a plate was obtained for the sake of comparison from 50 parts by weight of phenyl methacrylate and 50 parts by weight of styrene. When it was dipped in acetone, its dissolution started immediately from the surfaces thereof.

Example 5

To a monomer composition which had been obtained by mixing 45 parts by weight of tris(2-allyloxyethyl) isocyanurate of the formula (A) in which $R^1$ is $-CH_2CH_2OCH_2-CH=CH_2$, 20 parts by weight of diethylene glycol diallyl ether represented by the following formula:

$$CH_2=CHCH_2O(CH_2CH_2O)_2OCH_2CH=CH_2$$

and 35 parts by weight of diallyl phthalate represented by the formula:

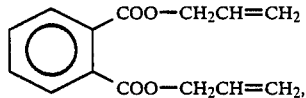

3 part by weight of isopropyl peroxydicarbonate was added as a polymerization initiator. The resultant mixture was poured into lens-shaped glass molds. After allowing it to stand at 40° C. for 5 hours, it was heated from 40° C. to 85° C. over 16 hours so that colorless transparent concave lenses having an outer diameter of 70 mm, a central thickness of 1.9 mm and a degree of $-2.75$ diopter were produced.

The refractive index, $n_d$, of the lenses was 1.535 and their Abbe number was 43. On the other hand, their specific gravity was 1.24. With respect to the lenses, the transmission in the visible range was measured in the same manner as in Example 1. It was found to be 91%.

The lenses were dipped in organic solvents such as acetone, toluene and tetrahydrofuran in the same manner as in Example 1. They were not damaged at all.

The lenses were subjected to a dyeing treatment in the same manner as in Example 1. As a result, they were successfully dyed in a vivid blue color.

Using the lenses as samples, a similar impact resistance test as in Example 1 was performed on ten of the samples in accordance with the falling ball method. None of the samples were broken.

Comparative Example 1

A monomer mixture which had been obtained by adding 3 parts by weight of isopropyl peroxydicarbonate to 100 parts by weight of commercial diethylene glycol bis(allyl carbonate) was polymerized by a similar process as in Example 5, whereby concave lenses having a central thickness of 1.9 mm were produced.

The refractive index $n_d$, Abbe number and specific gravity of the lenses were 1.496, 56 and 1.31 respectively.

Comparative Example 2

Concave lenses having a central thickness of 1.9 mm were produced in the same manner as in Example 5 except that the proportions, of tris(2-allyloxyethyl) isocyanurate, diethylene glycol diallyl ether and diallyl phthalate were changed to 25 parts by weight, 20 parts by weight and 55 parts by weight respectively.

The refractive index, $n_d$, of the lenses was 1.541. Using the lenses as samples, a similar impact resistance test as in Example 1 was carried out on ten of the lenses by the falling ball method. Eight of the lenses were broken.

It has hence been found from the foregoing that these lenses had the high refractive index but their impact resistance is small. This can be attributed to the unduly small proportion of Component A.

Example 6

To a monomer composition which had been obtained by mixing 40 parts by weight of tris(2-allyloxyethyl) isocyanurate (see Example 5), 20 parts by weight of 1,3-butanediol diallyl ether represented by the following formula:

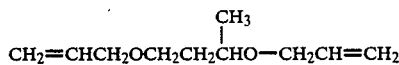

and 40 parts by weight of allylphenol represented by the following formula:

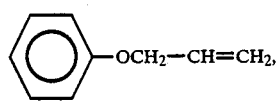

3 parts by weight of isopropyl peroxydicarbonate were added as a polymerization initiator. The resultant mixture was polymerized in the same manner as in Example 5, thereby obtaining concave lenses having an outer diameter of 75 mm, a central thickness of 1.8 mm and a degree of −2.50 diopter.

The refractive index $n_d$, Abbe number and specific gravity of the lenses were 1.538, 41 and 1.22 respectively. In addition, the transmission of those lenses in the visible range was measured in the same manner as in Example 1. It was found to be 92%.

The lenses were dipped in organic solvents such as acetone, toluene and tetrahydrofuran in the same manner as in Example 1. They were not damaged at all.

Those lenses were also subjected to a dyeing treatment in the same manner as in Example 1. As a result, they were successfully dyed in a vivid blue color Using them as samples, a similar impact resistance test as in Example 1 was performed on 30 of the samples in accordance with the falling ball method. Only 6 lenses were broken, so that the lenses were found to have excellent impact resistance.

Comparative Example 3

Concave lenses having an outer diameter of 75 mm and a central thickness of 1.8 mm were produced by polymerizing a monomer composition, which had been obtained by mixing 40 parts by weight of triallyl isocyanurate of the formula (A) in which $R^1$ is —CH$_2$—CH=CH$_2$, 20 parts by weight of 1,3-butanediol diallyl ether (see Example 6) and 40 parts by weight of allylphenol (see Example 6), in a similar manner as in Example 6.

Although the refractive index, $n_d$, of those lenses was 1.540, all the samples were broken when a similar impact resistance test as in Example 6 was conducted.

From the results of Example 6 and Comparative Example 3, it is understood that a copolymer having inferior impact resistance is obtained when the substituent groups bonded to the nitrogen atoms of the triazine skeleton are small.

Example 7

To a monomer composition which had been obtained by mixing 40 parts by weight of tris(2-acryloxyethyl) isocyanurate of the formula (A) in which $R^1$ is

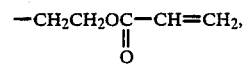

25 parts by weight of 1,3-butanediol dimethacrylate represented by the following formula:

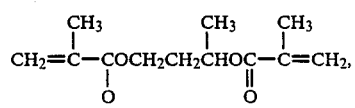

10 parts by weight of α-methylstyrene and 25 parts by weight of 2,2-bis[4-(methacryloxyethoxy)phenyl]propane represented by the following formula:

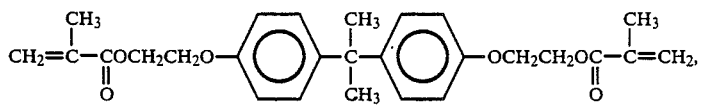

1.0 part by weight of lauroyl peroxide was added as a polymerization initiator. The resultant mixture was polymerized in the same manner as in Example 5, thereby obtaining concave lenses having an outer diameter of 75 mm, a central thickness of 1.8 mm and a degree of −3.00 diopter.

The refractive index $n_d$, Abbe number and specific gravity of those lenses were 1.538, 40 and 1.20 respectively. In addition, the transmission of those lenses in the visible range was measured in the same manner as in Example 1. It was found to be 91%.

The lenses were dipped in organic solvents such as acetone, toluene and tetrahydrofuran in the same manner as in Example 1. They were not damaged at all.

Those lenses were also subjected to a dyeing treatment in the same manner as in Example 1. As a result, they were successfully dyed in a vivid blue color.

Using them as samples, a similar impact resistance test as in Example 1 was performed on 10 of the samples in accordance with the falling ball method. None of the samples were broken.

Comparative Example 4

Concave lenses having a central thickness of 1.8 mm were produced by mixing 15 parts by weight of tris(2-allyloxyethyl) isocyanurate (see Example 7), 25 parts by weight of 1,3-butanediol dimethacrylate (see Example 7), 30 parts by weight of α-methylstyrene and 30 parts by weight of 2,2-bis[4-(methacryloxyethoxy)phenyl]propane (see Example 7) and then polymerizing the resultant mixture in a similar manner as in Example 7.

The refractive index, $n_d$, of those lenses was 1.542. Using the lenses as samples, a similar impact resistance test as in Example 1 was carried out on ten of the lenses by the falling ball method. All the 10 lenses were broken.

As demonstrated above, a smaller proportion of Component A will result in a copolymer having small impact resistance.

Example 8

To a monomer composition which had been obtained by mixing 45 parts by weight of tris-N-(methacryloxyethoxycarbamoylhexyl) isocyanurate (see Example 3), 25 parts by weight of 1,3-butanediol dimethacrylate (see Example 7), 10 parts by weight of α-methylstyrene and 20 parts by weight of 2,2-bis[4-(methacryloxyethoxy)phenyl]propane (see Example 7), 1.0 part by weight of lauroyl peroxide was added as a polymerization initiator. The resultant mixture was polymerized to obtain concave lenses having an outer diameter of 75 mm, a central thickness of 1.8 mm and a degree of −2.50 diopter.

The refractive index $n_d$, Abbe number and specific gravity of the lenses were 1.536, 42 and 1.21 respectively. In addition, the transmission of those lenses in the visible range was measured in the same manner as in Example 1. It was found to be 91%.

The lenses were dipped in organic solvents such as acetone, toluene and tetrahydrofuran in the same manner as in Example 1. They were not damaged at all.

Those lenses were also subjected to a dyeing treatment in the same manner as in Example 1. As a result, they were successfully dyed in a vivid blue color.

Using them as samples, a similar impact resistance test as in Example 1 was performed on 10 of the samples in accordance with the falling ball method. None of the samples were broken.

Example 9

To a monomer composition which had been obtained by mixing 50 parts by weight of tris(acryloxyethoxyethyl) isocyanurate of the formula (A) in which $R^1$ is

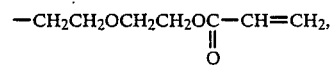

15 parts by weight of 1,6-hexanediol dimethacrylate represented by the following formula:

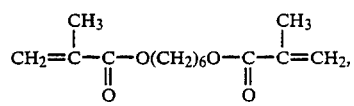

10 parts by weight of α-methylstyrene and 25 parts by weight of 2,2-bis[4-(methacryloxydiethoxy)phenyl]propane represented by the following formula:

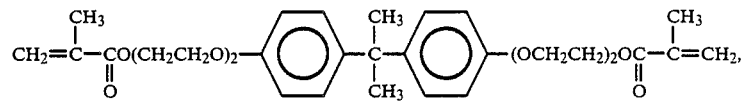

1.0 part by weight of lauroyl peroxide was added. The resultant mixture was polymerized to produce concave lenses having an outer diameter of 75 mm, a central thickness of 1.8 mm and a degree of −2.50 diopter.

The refractive index $n_d$, Abbe number and specific gravity of those lenses were 1.532, 45 and 1.20 respectively. In addition, the transmission of those lenses in the visible range was measured in the same manner as in Example 1. It was found to be 92%.

The lenses were dipped in organic solvents such as acetone, toluene and tetrahydrofuran in the same manner as in Example 1. They were not damaged at all.

Those lenses were also subjected to a dyeing treatment in the same manner as in Example 1. As a result, they were successfully dyed in a vivid blue color.

Using them as samples, a similar impact resistance test as in Example 1 was performed on 10 of the samples in accordance with the falling ball method. None of the samples were broken.

Example 10

To a monomer composition which had been obtained by mixing 45 parts by weight of tris-N-(triallyloxycarboxyethyl) isocyanurate of the formula (A) in which $R^1$ is

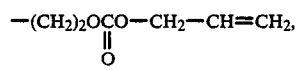

20 parts by weight of 1,3-butanediol diallyl ether (see Example 6), 15 parts by weight of allylphenol (see Example 6), 20 parts by weight of diallyl phthalate (see Example 5), 3.0 parts by weight of isopropyl peroxydicarbonate were added. The resultant mixture was polymerized to obtain concave lenses having an outer diameter of 75 mm, a central thickness of 1.8 mm and a degree of −2.50 diopter The refractive index $n_d$, Abbe number and specific gravity of the lenses were 1.536, 43 and 1.21 respectively. In addition, the transmission of those lenses in the visible range was measured in the same manner as in Example 1. It was found to be 92%.

The lenses were dipped in organic solvents such as acetone, toluene and tetrahydrofuran in the same manner as in Example 1. They were not damaged at all.

Those lenses were also subjected to a dyeing treatment in the same manner as in Example 1. As a result, they were successfully dyed in a vivid blue color.

Using them as samples, a similar impact resistance test as in Example 1 was performed on 10 of the samples in accordance with the falling ball method. None of the samples were broken.

Example 11

To a monomer composition which had been obtained by mixing 40 parts by weight of tris(methacryloxyethoxypropyl) isocyanurate of the formula (A) in which $R^1$ is

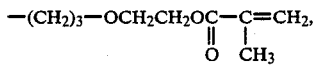

25 parts by weight of diethylene glycol dimethacrylate represented by the following formula:

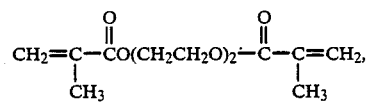

10 parts by weight of divinylbenzene and 25 parts by weight of α-methylstyrene, 1.0 part by weight of lauroyl peroxide was added. The resultant mixture was polymerized to produce concave lenses having an outer diameter of 75 mm, a central thickness of 1.8 mm and a degree of −4.00 diopter.

The refractive index $n_d$, Abbe number and specific gravity of those lenses were 1.564, 40 and 1.22 respectively. In addition, the transmission of those lenses in the visible range was measured in the same manner as in Example 1. It was found to be 91%.

The lenses were dipped in organic solvents such as acetone, toluene and tetrahydrofuran in the same manner as in Example 1. They were not damaged at all.

Those lenses were also subjected to a dyeing treatment in the same manner as in Example 1. As a result, they were successfully dyed in a vivid blue color.

Using them as samples, a similar impact resistance test as in Example 1 was performed on 10 of the samples in accordance with the falling ball method. None of the samples were broken.

Example 12

Concave lenses having an outer diameter of 75 mm, a central thickness of 1.7 mm and a degree of −4.00 diopter were produced by polymerizing a monomer composition, which had been obtained by mixing 40 parts by weight of tris-N-(methacryloxyethoxycarbamoylhexyl) isocyanurate (see Example 3), 15 parts by weight of diethylene glycol dimethacrylate (see Example 11), 20 parts by weight of a phthalic acid ester polycondensation product of the following formula:

and 25 parts by weight of α-methylstyrene, in a similar manner as in Example 5.

The refractive index $n_d$, Abbe number and specific gravity of the lenses were 1.542, 44 and 1.20 respectively. In addition, the transmission of those lenses in the visible range was measured in the same manner as in Example 1. It was found to be 91%.

The lenses were dipped in organic solvents such as acetone, toluene and tetrahydrofuran in the same manner as in Example 1. They were not damaged at all.

Those lenses were also subjected to a dyeing treatment in the same manner as in Example 1. As a result, they were successfully dyed in a vivid blue color.

Using them as samples, a similar impact resistance test as in Example 1 was performed on 10 of the samples in accordance with the falling ball method. None of the samples were broken.

What is claimed is:

1. An optical material comprising a copolymer obtained by polymerizing a monomer composition composed of at least 30 parts by weight of Component A, which comprises a trifunctional monomer represented by the following formula [A], and at most 70 parts by weight of a monomer copolymerizable with Component A;

Formula [A]

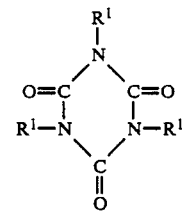

wherein R¹ means

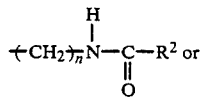

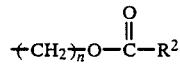

in which n is an integer of 2-8 and R² is a radically-polymerizable functional group represented by

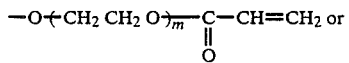

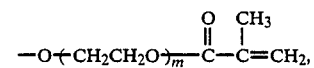

m being an integer of 0-2.

2. The optical material as claimed in claim 1, wherein n is an integer of 3-8 in the formulae representing R¹ of the formula [A].

3. The optical material as claimed in claim 1, wherein the radically-polymerizable functional groups of Component A are acryl or methacryl groups, and the monomer copolymerizable with Component A contains at last one radically-polymerizable acryl, methacryl or vinyl group.

4. An optical material comprising a copolymer obtained by polymerizing a monomer composition composed of 30-65 parts by weight of component A which comprises a trifunctional monomer represented by the following formula [A], 10-30 parts by weight of component B which comprises an aliphatic bifunctional monomer represented by the following formula [B], and 30-55 parts by weight of component C formed of a copolymerizable monomer which is copolymerizable with components A and B and contains an aromatic group;

Formula [A]

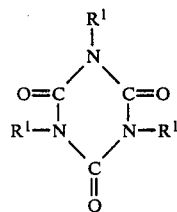

wherein R¹ means

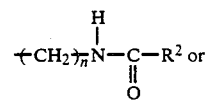

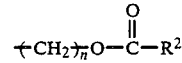

in which n is an integer of 2-8 and R² is a radically-polymerizable functional group represented by

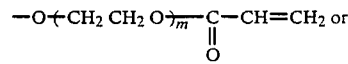

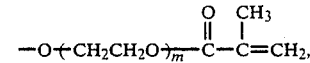

m being an integer of 0-2;

Formula ]B]

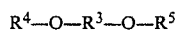

wherein R³ means a hydrocarbon group having 2-8 carbon atoms, and R⁴ and R⁵ may be the same or different and individually denote a radically-polymerizable functional group represented by

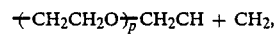

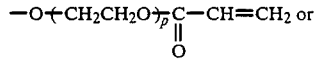

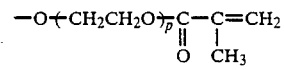

p being an integer of 0-2.

5. The optical material as claimed in claim 4, wherein the proportion of Component A is at least 35 parts by weight per 100 parts by weight of the monomer composition.

6. The optical material as claimed in claim 4, wherein the radically-polymerizable functional groups of Component A are allyl groups, and the radically-polymerizable functional groups of Component B and at least one functional group of Component C are each an allyl group.

7. The optical material as claimed in claim 4, wherein the radically-polymerizable functional groups of Component A are acryl or methacryl groups, and the radically-polymerizable functional groups of Component B and at least one functional group of Component C are each an acryl or methacryl group.

* * * * *